(12) United States Patent
Songwe

(10) Patent No.: US 7,474,204 B2
(45) Date of Patent: Jan. 6, 2009

(54) VEHICLE INFORMATION/CONTROL SYSTEM

(75) Inventor: Jr Neville Songwe, Providence, RI (US)

(73) Assignee: Joneso Design & Consulting, Inc., Providence, RI (US)

( * ) Notice: Subject to any disclaimer, the term of this patent is extended or adjusted under 35 U.S.C. 154(b) by 226 days.

(21) Appl. No.: 11/448,453

(22) Filed: Jun. 6, 2006

(65) Prior Publication Data

US 2006/0286944 A1    Dec. 21, 2006

Related U.S. Application Data

(60) Provisional application No. 60/688,030, filed on Jun. 7, 2005, provisional application No. 60/688,080, filed on Jun. 6, 2005.

(51) Int. Cl.
*B60Q 1/00* (2006.01)

(52) U.S. Cl. .......................... 340/461; 296/70; 296/74; 296/37.12; 340/465

(58) Field of Classification Search .................. 340/461, 340/438, 425.5, 384.4, 465; 296/70–74, 296/97.7, 24.39, 193.01, 193.03, 193.04; 280/727, 752; 224/483; 362/489; 108/45; D12/192, 415

See application file for complete search history.

(56) References Cited

U.S. PATENT DOCUMENTS

| | | | | | |
|---|---|---|---|---|---|
| 2,546,459 | A | * | 3/1951 | Lee .............................. | 108/28 |
| 5,821,935 | A | * | 10/1998 | Hartman et al. ............. | 715/839 |
| 5,857,726 | A | * | 1/1999 | Yokoyama et al. ............ | 296/70 |
| 6,129,406 | A | * | 10/2000 | Dauvergne .................... | 296/70 |
| 6,322,122 | B2 | * | 11/2001 | Burns et al. ................. | 296/24.3 |
| 6,447,041 | B1 | * | 9/2002 | Vandersluis et al. ........... | 296/72 |
| 6,448,893 | B1 | * | 9/2002 | Dobberkau et al. ......... | 340/461 |
| 6,641,195 | B2 | * | 11/2003 | Shikata et al. ................ | 296/70 |
| 7,126,583 | B1 | * | 10/2006 | Breed .......................... | 345/158 |
| 2001/0033087 | A1 | * | 10/2001 | Volkmann et al. ............. | 296/70 |
| 2003/0040865 | A1 | * | 2/2003 | Rigazio et al. .............. | 701/207 |
| 2004/0066305 | A1 | * | 4/2004 | Rubenstein ................. | 340/692 |
| 2005/0030256 | A1 | * | 2/2005 | Tubidis et al. ................ | 345/30 |

* cited by examiner

*Primary Examiner*—Brent Swarthout
(74) *Attorney, Agent, or Firm*—Mintz, Levin, Cohn, Ferris, Glovsky and Popeo, P.C.

(57) ABSTRACT

An instrument panel, for use with a vehicle including a body, wheels, a driver seat, and an engine, is configured to be disposed at least partially in front of the seat and includes a steering wheel disposed in front of the seat, a display configured to provide information to a person seated in the seat, and a modular housing configured to hold the display and the steering wheel, the steering wheel being rotatably connected to the housing, the display connected to the housing, the housing extending substantially an entire width of a passenger area of the vehicle, the modular housing including independent sections that can be removed and replaced independently of any other section of the housing.

15 Claims, 5 Drawing Sheets

VEHICLE INFORMATION/CONTROL SYSTEM

CROSS-REFERENCE TO RELATED ACTIONS

This application claims the benefit of U.S. Provisional Application No. 60/688,080 filed Jun. 6, 2005, and U.S. Provisional Application No. 60/688,030 filed Jun. 7, 2005, which are incorporated herein by reference.

BACKGROUND

Vehicle interiors provide drivers and passengers with information, functionality, and, preferably, comfort. Information such as speed, engine temperature, gas level, oil level and/or pressure, engine or other component functional state (e.g., windshield washer fluid level, operational status of lights such as brake lights, etc.) can be provided through a variety of gauges, readouts, etc. The interiors also provide functional features such as turn signal indicators, a horn, a heater, an air condition, audio components, lights, storage areas (e.g., a console and/or a glove compartment), etc. Further, the interiors provide comfort through soft, adjustable seats, tinted windows, etc. The interiors are preferably ergonomically designed to make operating the vehicle, including actuating and using the functional components, both uncomplicated and physically easy.

Different vehicle interiors are provided for different applications. For example, luxury vehicle interiors are typically provided with more amenities than those of pickup trucks. Specialty functions, such as a winch, can be operated from the interior of specific vehicles, such as a tow truck.

Police vehicles represent a particular class of vehicles that have features not typically found in other vehicles. For example, in recent years, police cars have been frequently equipped with computer equipment to facilitate database searching, e.g., of license plates of cars to check on the background of the owner of a vehicle that has been stopped, to check the criminal record of the expected driver or possible passengers of the stopped vehicle, etc. The computer equipment is typically mounted to a bracket attached to the dashboard of the police car. The bracket may be movable so that the computer can be adjusted according to the preferences of the user. Also, a speaker is typically mounted to the driver's seat on the driver's right side. Such vehicle interiors have many safety/health issues because, e.g., they have many sharp edges and corners, impede egress of the driver through the passenger door, present many items that can be tossed about causing injury to the driver, even for minor accidents such as fender benders (that constitute approximately 85% of all police-involved vehicular accidents), and induce hearing problems in many officers (approximately 75% of officers in one police department had hearing problems in their right ears).

SUMMARY

In general, in an aspect, the invention provides, an instrument panel for use with a vehicle including a body, wheels, a driver seat, and an engine, the instrument panel configured to be disposed at least partially in front of the seat and including a steering wheel disposed in front of the seat, a display configured to provide information to a person seated in the seat, and a modular housing configured to hold the display and the steering wheel, the steering wheel being rotatably connected to the housing, the display connected to the housing, the housing extending substantially an entire width of a passenger area of the vehicle, the modular housing including independent sections that can be removed and replaced independently of any other section of the housing.

Implementations of the invention may include one or more of the following features. The instrument panel is configured to be disposed in a car containing the driver seat and a front passenger seat, the instrument panel being configured to be disposed in the car and separated from the driver seat and the passenger seat to provide a substantially open path between the driver seat and the passenger seat. The instrument panel is configured to be disposed in the car and separated from the driver seat and the passenger seat by a sufficient distance to allow a person to move the person's legs horizontally from in front of one of the seats to in front of the other seat. The housing is configured to provide a filing cabinet compartment. The housing is configured to provide the filing cabinet compartment sloping downward from front to back.

Also, implementations of the invention may include one or more of the following features. The housing provides a keyboard receptacle and the instrument panel further includes a keyboard assembly configured to be retracted within the keyboard receptacle and extended from the keyboard receptacle, the keyboard assembly including a support and a keyboard rotatably connected to the support. The instrument panel further includes radio channel selectors coupled to a two-way radio and configured to select corresponding channels of the radio, the channel selectors being configured and disposed to be actuated by a user wearing gloves while inhibiting multiple simultaneous actuation of the selectors by a single digit of the user. The instrument panel further includes a first display screen disposed within the housing and configured to be moved to face either the driver seat or a passenger seat of the vehicle. The instrument panel further includes: a second display screen; and a computer coupled to the first and second display screens and configured to receive a wireless communication from outside of the vehicle and to cause the first display screen to display detailed information of the wireless communication and to cause the second display screen to display summary information of the wireless communication, where the second display screen is disposed substantially in front of the driver seat.

Also, implementations of the invention may include one or more of the following features. The instrument panel further includes a steering wheel assembly connected to the housing and including: a central unit including an interface panel disposed in front of the driver seat and configured to be physically accessed by a person in the driver seat; and a steering wheel rotatably connected to the central unit, where the central unit and steering wheel are configured such that interface panel will remain stationary relative to the housing while the steering wheel is rotated. The interface panel includes actuators disposed within reach of a typical adult's thumbs when the adult's hands are grasping the steering wheel. The steering wheel is connected to the central unit by a connecting member and the interface panel is disposed distally from the connecting member relative to the housing.

Also, implementations of the invention may include one or more of the following features. The instrument panel further includes actuator knobs configured to control operational status of corresponding features of the vehicle, the knobs being configured to configured and spaced to facilitate actuation by a user wearing gloves and to inhibit accidental actuation of an adjacent one of the knobs. Each of the knobs includes a grooved collar rotatably connected to a fixed shaft.

In general, in another aspect, the invention provides an instrument panel for use with a police vehicle including a body, wheels, a driver seat, and an engine, the instrument panel being configured to be disposed at least partially in front of the seat and including a housing, a steering wheel assembly including a steering wheel disposed in front of the seat and fixedly coupled to a steering column, the steering wheel being rotatably connected to the housing, a computer disposed within the housing and configured to receive wireless communications, and a display configured to provide information to a person seated in the seat, the display being coupled to a computer and configured to display information wirelessly received by the computer, the display being disposed relative to the housing to be directly in front the driver seat, where the computer is configured to cause the display to display summary information, regarding a possible crime, received wirelessly by the computer.

Implementations of the invention may include one or more of the following features. The display is held by the housing and disposed to be viewed by a person sitting in the seat by looking between the steering wheel and the steering column. The steering wheel assembly includes a center portion connected to the steering wheel and wherein the display is connected to the center portion. The center portion is rotatably connected to the steering wheel such that the center portion remains stationary relative to the housing while the steering wheel is rotated.

In general, in another aspect, the invention provides an instrument panel for use with a police vehicle including a body, wheels, a driver seat, a passenger seat, and an engine, the instrument panel being configured to be disposed in a passenger compartment of the vehicle and at least partially in front of the seat and including: a modular housing extending substantially an entire width of the passenger compartment, the modular housing including independent sections that can be removed and replaced independently of any other section of the housing; a steering column connected to the housing and including function selectors disposed on a terminal end of the steering column; a steering wheel rotatably connected to the steering column and connected to the housing to be disposed in front of the driver seat with the instrument panel disposed in the passenger compartment, the steering wheel being sized such that the function selectors are disposed centrally relative to a perimeter of the steering wheel with the function selectors remaining stationary relative to the housing while the steering wheel is rotated; a computer disposed within the housing and configured to receive wireless communications; a first display configured to provide information to a person seated in the seat, the first display being coupled to the computer and configured to display information wirelessly received by the computer, the first display being disposed relative to the housing to be directly in front the driver seat; a second display integrated into one of the modular housing sections and configured to tilt horizontally and vertically to face either the driver seat or the passenger seat; and a keyboard retractably mounted to the dashboard to be received by the dashboard or extended from the dashboard and rotated when extended from the dashboard.

Implementations of the invention may include one or more of the following features. At least one of the housing sections provides a shelving unit of slots extending downwardly away from a front of the housing section to receive and retain items placed in the shelving unit, and wherein at least one of the housing sections provides a substantially horizontal, substantially flat, supported surface configured to be extended from and retracted into the housing.

In accordance with implementations of the invention, one or more of the following capabilities may be provided. Features of a vehicle may be selected and/or actuated through steering wheel column selectors that are substantially stationary despite rotation of the steering wheel. Writing on papers can be facilitated in a vehicle interior. Paperwork can be stored and organized efficiently in a vehicle interior. Repairs can be made to dashboard functionality in a vehicle without disassembling or disrupting the entire dashboard. Devices can be provided to a vehicle's occupant and selectively withdrawn into and contained by the dashboard. Information of particular relevance to a vehicle's occupant or expected occupant can be provided in an easily viewable location traditionally occupied by less relevant information. Effort to perform tasks in a vehicle interior may be reduced. Performance of tasks in a vehicle interior may be improved. Tasks in a vehicle interior may be simplified and may be performed by most persons. Vehicle user overexertion and injuries may be reduced, especially injuries due to repetitive operations. Vehicle operator, e.g., police officer, fatigue may be reduced. Vehicle operators skills and abilities may be better utilized than with previous vehicle interiors. A safe, effective, and efficient vehicle interior may be provided, e.g., for police officers to carry out their duties. Job efficiency and safety of vehicle operators, and those potentially affected by operation of vehicles, may be improved. Vehicle operator (e.g., police officer) physiological and/or psychological well-being may be improved relative to those using vehicles with traditional interiors. Injury due to objects moving due to a collision may be reduced. Hearing impairment, e.g., of police officers, may be reduced. Health costs and lost employee on-the-job time due to injuries may be reduced. Driver's tools such as guns and batons for police officers, may be better accommodated to reduce annoyance and injury to the officers, and wear on vehicle interiors. Clutter inside a vehicle's passenger compartment can be reduced. Paper inside a police car can be reduced. Attention of a police officer on the officer's surroundings can be increased and/or distractions decreased. The quantity and/or frequency of times that a police officer looks down at information inside a police car, and/or the amount of time spent doing so, can be decreased. The need to post paper reminders or other information (e.g., hot sheets) can be reduced and/or eliminated. Communication between police officers and police dispatchers of different jurisdictions can be facilitated. Car handling and/or gas mileage may be improved compared to current cars, especially police cars. A more ergonomic vehicle interior, especially for police cars, may be provided. Police safety can be increased. Time spent issuing tickets by police can be reduced. Rage and/or frustration of persons pulled over by police can be reduced, e.g., by reducing time spent pulled over. A driver's attention to the road and the driver's surroundings (e.g., outside the driver's vehicle) can be increased. Mobility within a passenger compartment may be improved.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide improved vehicle interiors. For example, a vehicle interior includes a stationary steering wheel column with function selectors (e.g., buttons). The steering wheel includes a display screen in the center of a rotatable wheel. The screen is mounted on the column and remains stationary while the wheel is rotated relative to the column. Another display screen is integrated into a dashboard and is movable to assist viewing of the screen by persons in the driver's seat and the passenger seat. The dashboard comprises modular sections that can be removed and/or disassembled independently. The dashboard includes a shelving unit and/or a filing cabinet. One or more substantially horizontal surfaces are provided by the dashboard (e.g., by retractable plates). A keyboard for a computer is retractable within the dashboard and extendible from the dashboard and is pivotable for convenient access and operation by a user in either the driver seat or front passenger seat. A display panel behind the steering wheel provides information received by the vehicle, e.g., by the computer. This vehicle interior is exemplary, however, and not limiting of the invention as other implementations in accordance with the disclosure are possible.

Figure 1:
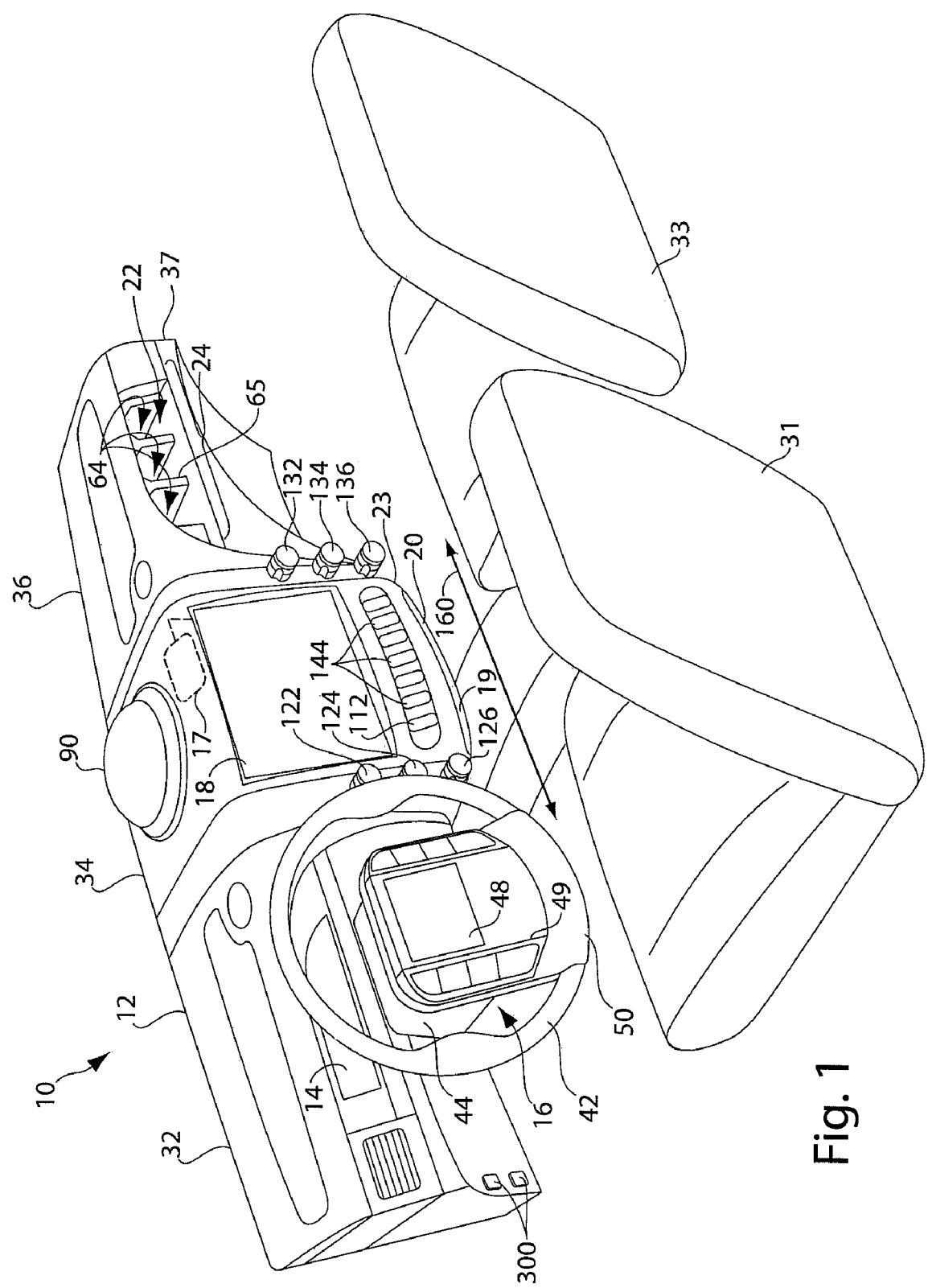
FIG. 1 is a perspective view of a vehicle interior including a dashboard.

Referring to FIG. 1, a vehicle interior 10 includes a modular dashboard 12, a display panel 14, a smart steering wheel assembly 16, an integrated display screen 18, a retractable keyboard assembly 20 (that includes a keyboard 19), a filing cabinet 22, and a retractable shelf 24. The interior 10 is configured particularly for law enforcement vehicles, although the interior 10 as a whole, or components thereof, especially the smart steering wheel assembly 16, can be used for other vehicles (e.g., cars, trucks, heavy equipment, etc.). The interior 10 preferably provides a pleasing appearance. The interior 10 is customized for police vehicles, although customization is possible for other vehicle types, and for the discussion below, is assumed to be incorporated into a police car.

The modular dashboard 12 includes three sections 32, 34, 36. The sections 32, 34, 36 are formed as independent units configured to be mounted on a horizontal structure running the width of the vehicle and can be assembled, opened, repaired, or replaced (e.g., upgraded) independently of each other. Thus, one section may be repaired or replaced without affecting the other sections. Further, any combination of the three sections 32, 34, 36 may be used in a vehicle, regardless of whether any of the other sections 32, 34, 36 are used. Further still, adapters or spacers may be provided as appropriate to fit the sections 32, 34, 36 into different vehicles of different widths, with the sections 32, 34, 36 preferably combining to be of a width that is equal to or smaller than the width of a car interior. The dashboard 12 without spacers is about five feet wide. The sections 32 and 36 are preferably about one foot in height and the center section 34 is preferably about 1.5 feet high. The sections 32, 34, 36 preferably include all embedded items such that different manufacturers need not be used, with different parts being purchased from different manufacturers and then assembled or added onto the vehicle after purchase of the vehicle.

The dashboard sections 32, 34 includes the digital display screen 14, the integrated display screen 18, the retractable keyboard assembly 20, and a computer 17 connected to the screen 18 and the keyboard 19 and disposed behind the screen 18. A user may interact with the computer 17, e.g., through the screen 18 and the keyboard 19. For example, a police officer can select/input information regarding a violation and the computer 17 determine (e.g., by searching a database) and inform the officer of pertinent information such as whether the violation requires a court summons and an appropriate location and court date. The computer 17 preferably causes the screen 18 to display information received, e.g., wirelessly, by the computer 17 ("call information"), e.g., through the E-911 system. This call information includes, for example, information from a dispatcher such as the location and description (e.g., word description and/or police code) of activity of interest to a police officer, such as a crime being committed or other activity that an officer might want to investigate. The call information can be verbal information that is converted to text by the computer 17, or sent as text to the computer 17, etc. Preferably, for call information from a police dispatcher, all other communications are overridden to provide priority for the call information. The call information may be displayed in all vehicles that receive the information or only in desired vehicles, e.g., those vehicles within a certain range of the location displayed, the N nearest vehicles to the displayed location, etc. The call information may be displayed in lieu of or in addition to traditional information displayed behind the steering wheel (e.g., speed, engine temperature, gas level, etc.). The computer 17 is configured to adapt to different communication protocols (e.g., frequencies of communications) corresponding to different jurisdictions. Preferably, detailed call information is provided on the integrated screen 18 and a summary of the detailed call information is displayed on the screen 14.

Figure 2:
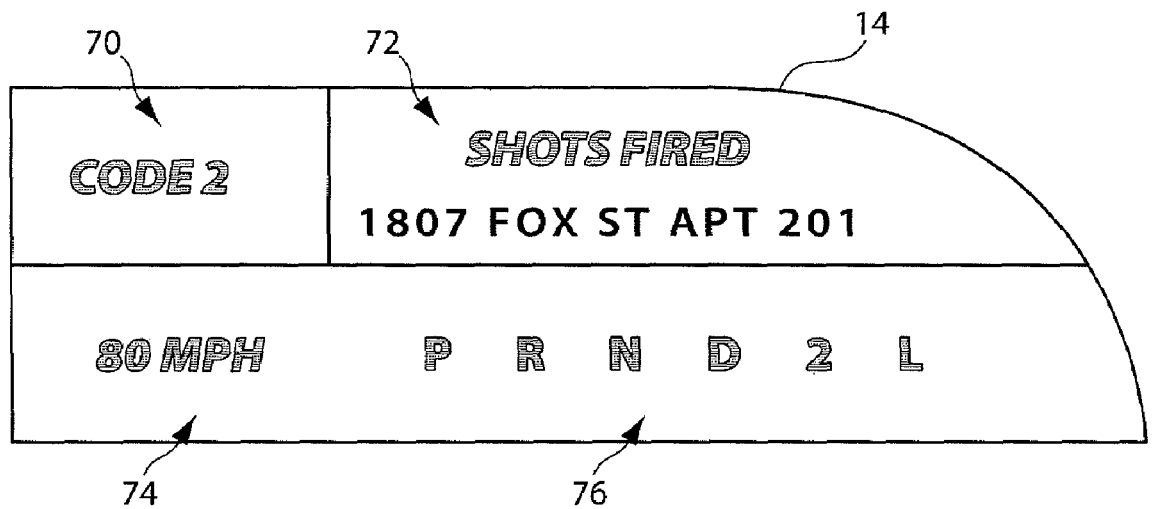
FIG. 2 is an exemplary screen shot of a display screen shown in FIG. 1.

Referring also to FIG. 2, the display screen 14 on the section 32 is configured to display the summary call information and other, traditional, information. The call information is displayed in a font that is easily read by the driver, e.g., with characters at least about 0.5 in. high. As shown in FIG. 2, the display 14 displays call information including an issue/crime code 70 and an issue/crime description 72, and other information including the vehicle's speed 74 and a gear select portion 76 showing the vehicle's gear and the available gears. The call information may be displayed on the screen 14 intermittently with traditional information (e.g., engine temperature, oil temperature, exterior temperature, battery level, oil pressure, gas level, remaining miles until gas depletion, etc.) and may only be displayed if there is current call information to be displayed and any previous call information has been removed (e.g., by the vehicle's operator or a central entity, e.g., that provided the call information). If no call information is being displayed, traditional information may be provided.

Figure 3:
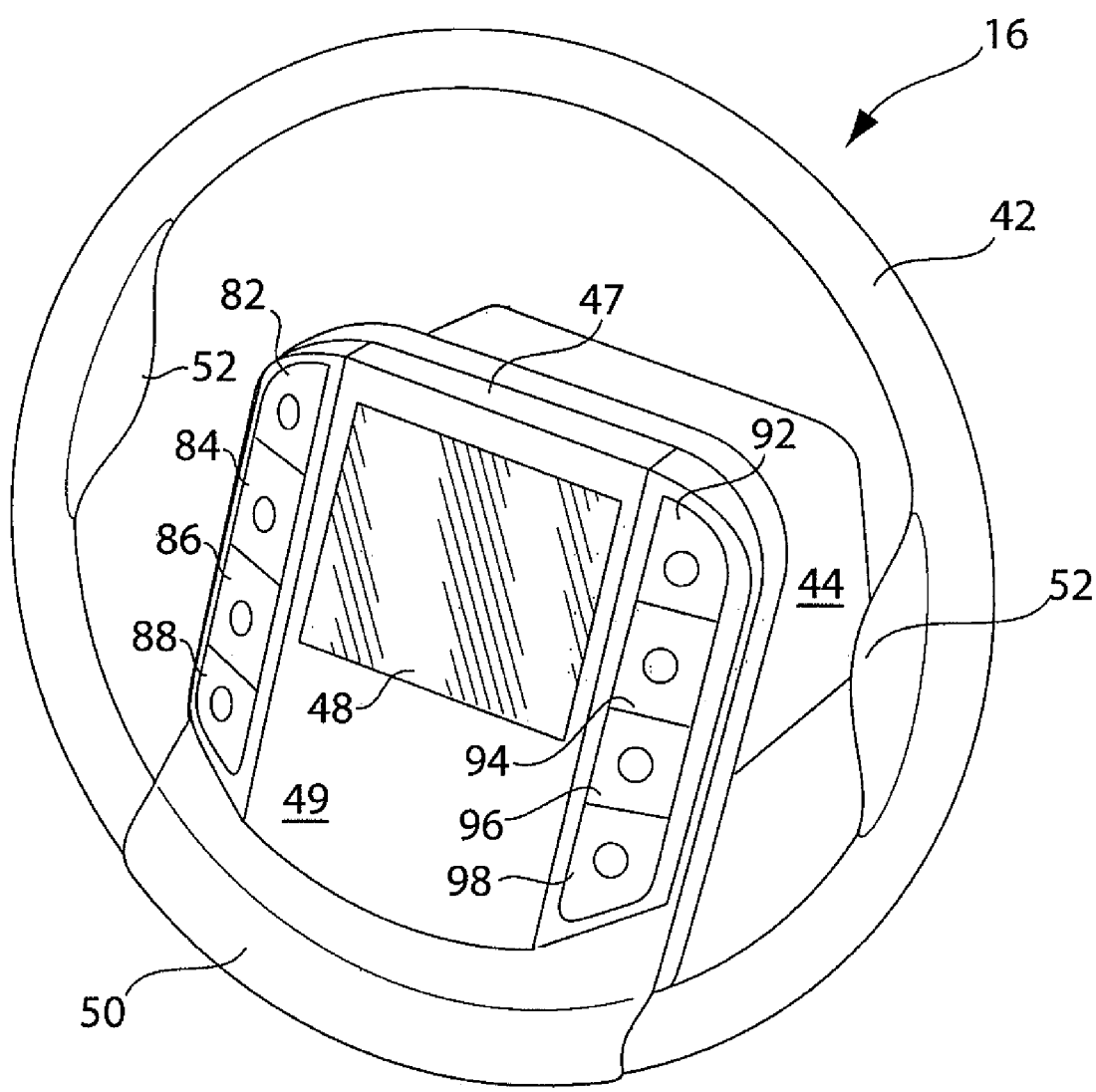
FIG. 3 is a perspective view of a steering wheel assembly shown in FIG. 1.

Referring also to FIG. 3, the dashboard section 32 also includes the smart steering wheel assembly 16. The smart steering wheel includes a steering wheel 42 and a central unit 44. The central unit 44 provides a stationary column at the end of which is a fixed interface unit 47 of about 8.25 in by about 8.25 in. and that includes function actuators (here buttons) 82, 84, 86, 88, 92, 94, 96, 98, and a display screen 48 behind which is an airbag compartment. The columns of the actuators 82, 84, 86, 88, 92, 94, 96, 98 are about five inches apart. Instead of the screen 48, there may be a blank front face covering the airbag compartment. Below the screen 48 is a flat hard panel 49 that may be used, e.g., for a writing surface. The display screen 48 could provide the detailed or summary call information (e.g., in lieu of the screen 14), and/or other information such as global positioning satellite (GPS) information or other location information to inform the user of the car's current position and/or directions for desired future driving and/or locations of other relevant things (e.g., location of building being burglarized, location of a vehicle being pursued, etc.). The display screen 48 could be touch sensitive and could include a virtual keyboard on the screen 48. Alternatively, a physical keyboard could be provided, e.g., below the screen 48. The screen 48 and the panel 49 are configured to move out of the way to make way for an airbag as it inflates.

The function actuators 82, 84, 86, 88, 92, 94, 96, 98 consolidate essential functions on the steering wheel 16. The actuators 82, 84, 86, 88, 92, 94, 96, 98 remain stationary while the wheel 42 is turned and are preferably disposed to be accessible to the typical adult driver's thumbs while the driver's hands are gripping the wheel 42. The actuator buttons 82, 84, 86, 88, 92, 94, 96, 98 are preferably sized such that icons on the buttons 82, 84, 86, 88, 92, 94, 96, 98 can be easily seen and recognized and such that the buttons 82, 84, 86, 88, 92, 94, 96, 98 can be easily selected by the driver's thumbs even if the driver is wearing gloves. For example, the buttons 82, 84, 86, 88, 92, 94, 96, 98 may be approximately one inch wide by approximately 1.5 in. high each. The actuators 82, 92 control the left alley lights and right alley lights, respectively, typically disposed in a light cluster on top of the police car, for illuminating the regions to the left and right, respectively, of the car. The actuator 84 controls the pull-over lights, strobes, and sirens of the car for use to indicate to a vehicle in front of the police car to pull over. The actuator 86 controls the take-down lights of the car that are used once a vehicle has pulled over to illuminate the interior of the vehicle and to inhibit persons in the vehicle from observing persons in the police car or approaching the vehicle from the police car. The actuator 88 controls the volume of radio communications into the car from a dispatcher. The actuator 96 controls a computer menu that can be shown on the display screen 48. The actuator 98 controls the image shown on the screen 48 to scroll the displayed image up or down. The actuator 94 controls a License Plate Recognition (LPR) system 90, discussed below.

Figure 4:
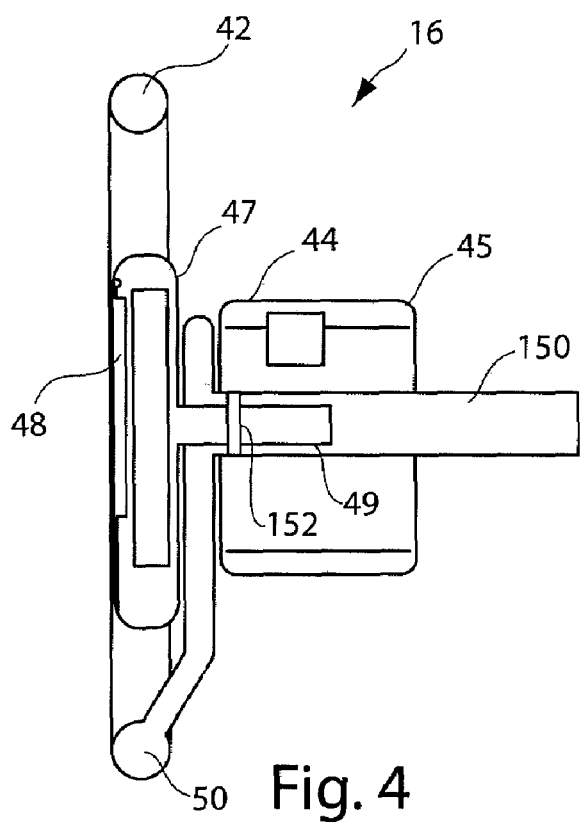
FIG. 4 is a partially cut-away side view of the steering wheel assembly shown in FIG. 1.
Figure 5:
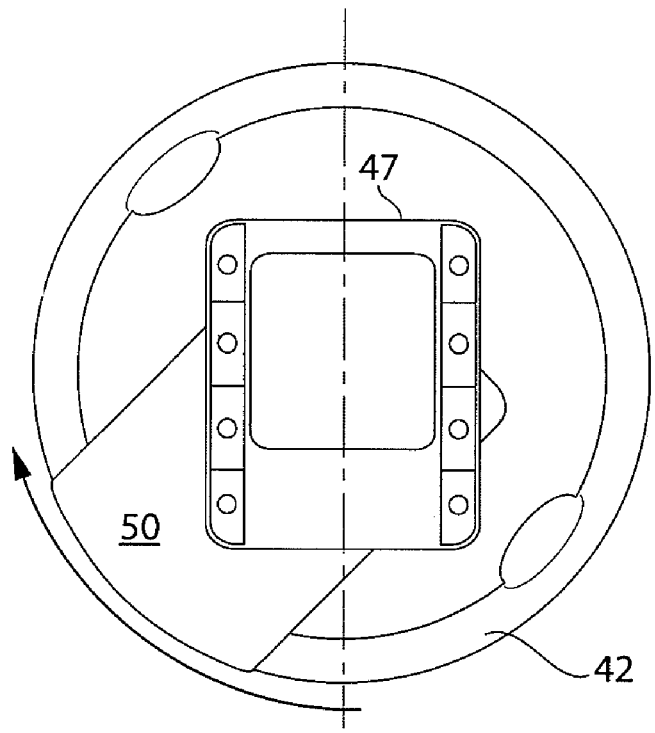
FIGS. 5-6 are front views of the steering wheel assembly shown in FIG. 1 with a steering wheel of the assembly rotated for right and left turns, respectively.
Figure 6:
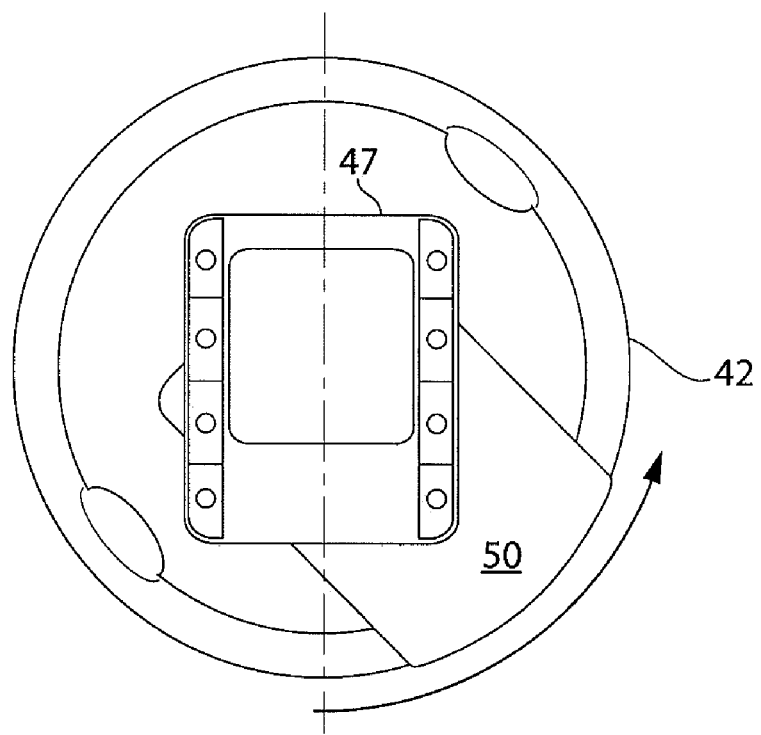

The central unit 44 also includes a sleeve 50 fixedly connected to the wheel 42 and rotatably mounted to the remainder of the central unit 44. The wheel 42 includes bulges 52 that extend inwardly on the wheel 42 that may be grasped by the operator. Referring to FIG. 4, a main housing 45 of the central unit 44 is fixedly attached to the interface unit 47 through a fixed shaft 49. A steering shaft 150 (that connects to further steering apparatus, and ultimately the tires) is rotatably connected to the fixed shaft 49 by a bearing ring 152. The bearing ring 152 allows rotation of the steering shaft 150, that is fixedly connected to the sleeve 50, that is in turn fixedly connected to the steering wheel 42. Thus, referring also to FIGS. 5-6, the central unit 44 remains stationary during rotation of the steering wheel 42. As such, the selectors 46 and screen 48 remain in fixed locations and orientations relative to the dashboard 12 during rotation of the steering wheel 42.

Referring to FIG. 1, the dashboard section 34 includes the LPR system 90, the display screen 18, and the keyboard assembly 20. The screen 18 is safely integrated inside the central dashboard section 34 and allows visual interaction from a significant portion of the angles inside a vehicle. The screen 18 is connected to the computer 17 and provides a user interface for displaying information (e.g., for police use, this information may relate to a car or owner of a car that a police officer has stopped and is going to approach). The information on the screen 18 may come from a central entity (e.g., police headquarters) in response to an inquiry, e.g., from the user input using the keyboard 19 or from the computer 17 using license plate information from the LPR system 90 mounted on the dashboard 12, here on the section 34. The screen 18 is embedded and integrated into the dashboard 12. The screen 18 is tiltable both horizontally and vertically to facilitate viewing of the screen 18 by persons in a driver's seat 31 or a passenger's seat 33. The screen 18 is configured to be tilted horizontally and vertically to be viewed from either the driver seat or the front passenger seat approximately head on (i.e., the screen 18 is approximately 90° relative to the line of sight of the viewing person to the screen 18 when angled appropriately).

Figure 7:
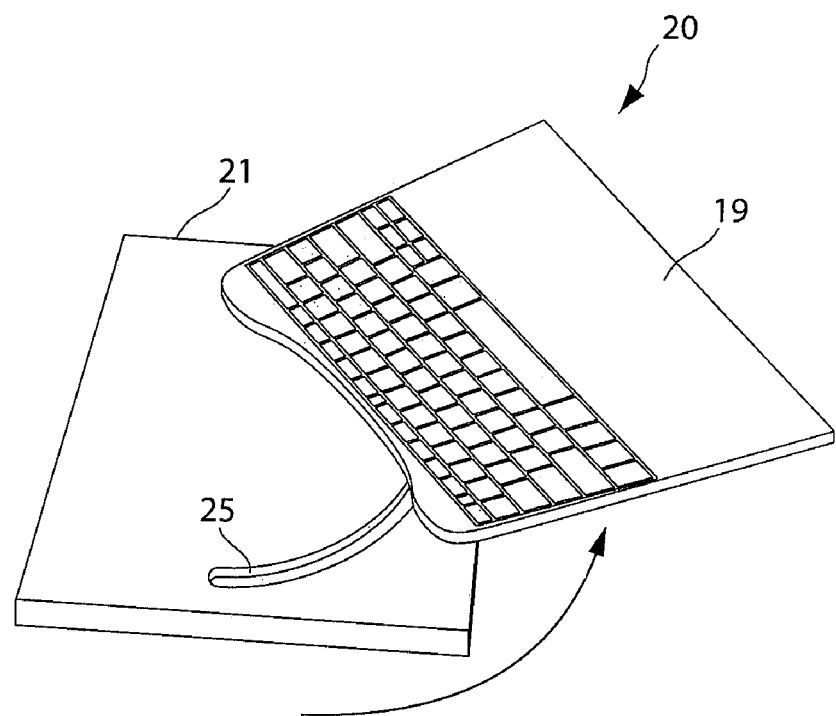
FIGS. 7-8 are perspective views of a keyboard assembly shown in FIG. 1 with a keyboard rotated for use by a passenger and a driver, respectively.
Figure 8:
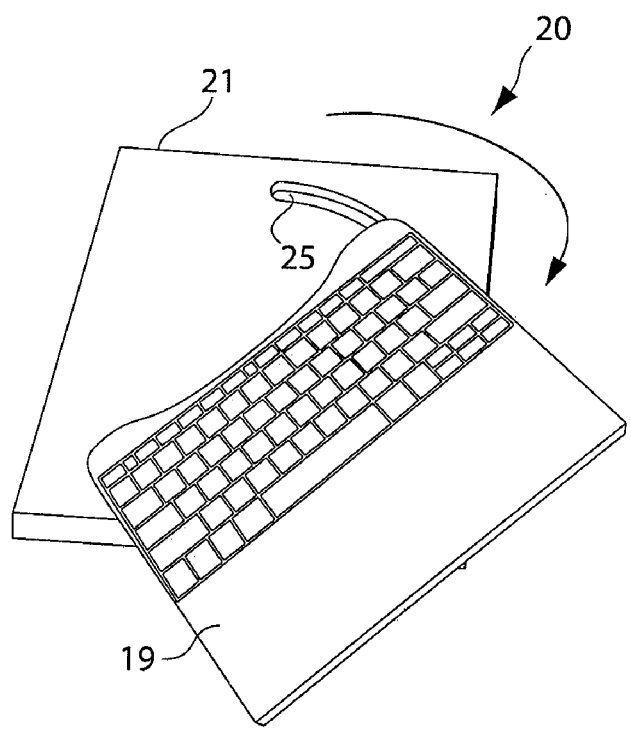

The keyboard assembly 20 is configured to provide convenient access by occupants of the vehicle and to be retracted. Referring also to FIGS. 7-8, the keyboard 19 is disposed on a support member 21 and the keyboard 19 and the support member 21 are retractable within a housing 23 of the dashboard section 34. In the retracted position, the keyboard 19 is preferably fully recessed inside the dashboard housing and thus out of the way (facilitating movement inside the vehicle). With the keyboard assembly 20 retracted, movement between the driver seat and the front passenger seat is relatively easy. Preferably, the dashboard 12 does not add items onto the floor of the car not normally occupied by a conventional, standard dashboard, especially between the front seats. With the keyboard assembly 20 retracted, there is preferably sufficient room for an adult's leg to pass horizontally as indicated by a double-ended arrow 160 between the dashboard section 34 and an armrest, console, or other item between the front seats. For example, with the keyboard assembly 20 fully retracted, there is preferably approximately at least about eight inches of open space above the floor in front of the section 34, more preferably at least about 10 inches, and more preferably at least about 12 inches. In the extended position as shown in FIG. 1, the keyboard 19 is within arm's reach of a user in the driver's seat. The keyboard 19 is rotatable relative to the support member 21 to further facilitate its use by a person in the driver's seat or the passenger's seat. The keyboard 19 has flared protrusions (not shown) disposed in flared slots 25 (which may be configured as a single, contiguous slot) to guide the keyboard 19 in its rotation and to help retain/hold the keyboard 19, i.e., inhibit the keyboard 19 from being separated from the support 21.

Referring to FIG. 1, disposed below the display screen 18 is a personal address actuator 112 and several, here six, radio channel selectors 114. The actuator 112 is configured to activate/deactivate the personal address system to allow an occupant of the car to broadcast the occupant's voice outside of the car. The selectors 114 are each configured to select a desired radio channel from for communication with other officers, dispatch, etc. The selectors 114 are each preferably configured to select one of the most commonly-used radio channels by the occupant. The actuator 112 and the selectors 114 are configured to be easily selected under conditions encountered by a police officer and are sized for easy actuation by a user even if the user is wearing gloves. The actuator 112 and the selectors 114 are configured and separated from each other by a sufficient distance, e.g., approximately 0.5 in., to help inhibit incorrect/accidental selection (especially simultaneous actuation of multiple, adjacent selectors 114 or the actuator 112 and the adjacent selector 114), by a single digit of the user even if the user is wearing gloves. For example, the actuator 112 and the selectors 114 are here configured as levers approximately 0.75 in. wide and approximately one inch above a pivot axis of the levers.

The LPR system 90 is disposed in the central dashboard section 34 and is configured to capture and process license plate images and provide appropriate corresponding information. The LPR system 90 provides automated computing and easy data referencing of license plates. The LPR system 90 includes a camera disposed on top of the section 34 and directed forward. The camera is configured to capture images of license plates of vehicles forward of the police car. The LPR system 90 can process captured images to perform optical character recognition (OCR) to determine the license plate number (including portions of license plate numbers) of the vehicles forward of the police car. The license plate number(s) are processed (either remotely by transmitting the numbers to an appropriate location) or locally (e.g., in the system 90 or in the computer 17 connected to the screen 18 and the keyboard 19) to match the numbers to corresponding information. This information could include the registered owner of the vehicle, as well as criminal record of the owner, known acquaintances of the owner, outstanding warrants for the owner, whether the vehicle has been reported stolen, etc. This information can be conveyed to the computer 17 and displayed, e.g., on the screen 18 and/or the screen 14 and/or the screen 48.

The LPR system 90 can be placed in an automatic mode or a manual mode. In automatic mode, if the LPR system 90 determines that a vehicle corresponds to a stolen vehicle or that the vehicle's owner should be stopped (e.g., has an outstanding warrant), then the LPR system 90 will automatically trigger the pull over lights and/or siren. The automatic mode can be overridden and the pull over lights and/or siren shut off manually. In either mode, the LPR system 90 can relay information such that it is displayed for the driver on any of the displays 14, 18, 48, but preferably detailed information is displayed on the screen 48, with summary information displayed on the screen 14. The summary information may be displayed on the screen 14 only after detailed information is removed from the screen 48, e.g., after a set amount of time.

The center dashboard section 34 further includes several, here six, actuator knobs 122, 124, 126, 132, 134, 136. The knobs 122, 124, 126, 132, 134, 136 are configured as collars disposed around corresponding shafts that can rotate around the shafts into several positions. Each of the knobs 122, 124, 126, 132, 134, 136 preferably provides positive feedback to a user that the knob 122, 124, 126, 132, 134, 136 has been rotated to one of the positions (e.g., by rotating freely between the positions, snapping into the positions, and resisting removal from the positions). The collars 122, 124, 126, 132, 134, 136 are generally circular with longitudinal slots along their lengths to facilitate gripping and rotating by a user, especially a user wearing gloves, and spaced from each other to inhibit accidental actuation of adjacent knobs 122, 124, 126, 132, 134, 136, e.g., at least about one inch. For example, the knobs 122, 124, 126, 132, 134, 136 may be about two inches in diameter, with four slots evenly spaced about their perimeters and the slots being about 0.5 in. wide and about 0.25 in. deep. The knobs 122, 124, 126, 132, 134, 136 can control functions similar or identical to those of the actuators 82, 84, 86, 88, 92, 94, 96, 98 (FIG. 3) to provide backup in case of failure of the actuators 82, 84, 86, 88, 92, 94, 96, 98. The knobs 122, 124, 126, 132, 134, 136 may also, or alternatively, control other features such as climate control (heat and/or air conditioning), the public address system, lights (e.g., one of the knobs could have four positions, one for off, one to actuate strobe lights inside the car only, one position to actuate the takedown lights only, and one positions to actuate both the strobes and the takedown lights), etc. The knobs 122, 124, 126, 132, 134, 136 in the exemplary embodiment shown control the horn, the siren, the lights/strobes, a fan speed, a temperature, and where heated/cooled air is directed (e.g., toward passenger feet, toward the windshield, etc.), respectively.

The dashboard section 36 includes the filing cabinet 22. The cabinet 22 comprises one or more slots (here 3) 64, separated by dividers 65, for storing items such as forms (e.g., traffic tickets, summonses) or other paperwork as desired by the user. Rails may be provided for sliding appropriately-sized file folders on the rails to further separate and organize materials to be stored. The slot 64 may be open (as shown) or have selectively-openable doors or other covers to help retain materials in the cabinet 22. As shown, the slots 64 are angled downwardly from fronts of the slots 64 to backs of the slots 64 to help retain materials in the slots 64 and inhibit them from sliding out of the slots 64. The dividers 65 are preferably configured as a single unit that can be removed to provide an opening into which another item or other items can be placed. For example, a printer could be put into the space occupied by the dividers 65. Preferably, the printer would be coupled (e.g., wirelessly coupled such as through a Bluetooth® connection) to the computer 17 behind the screen 18 and be configured to print relevant documents such as traffic tickets.

The retractable shelf 24 provide relatively horizontal, hard, flat, supported surface, e.g., on which a user may place paperwork and write on the paperwork. Most vehicles do not have hard, horizontal surfaces sufficient to use to support papers for writing on the papers. Police officers frequently need to write on papers, e.g., citations, and thus may benefit from the shelf 24. The shelf 24 is retractable into and extendable from a housing 37 of the section 36.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations. As another example, other mechanisms can be used to allow rotation of a steering wheel while keeping the central unit stationary, such as having the wheel connected to the central unit with spokes that are connected to a ring that is rotatable relative to the remainder of the central unit. Other embodiments of the invention could use voice activation to replace or supplement various physical interfaces/selectors/actuators. For example, the actuators 82, 84, 86, 88, 92, 94, 96, 98 could be eliminated and replaced with voice activation such that the user could speak the commands, which the computer 17 would recognize and take the appropriate action. Further, the wheel assembly 16 may also include other features such as a docking station for a mobile phone, personal digital assistant (PDA), etc. Further, a panic button system 300 may be provided that will cause the computer 17 to alert dispatch or other emergency entity of an emergency. The system 300 is preferably disposed in a location where the buttons will be unlikely to be accidentally activated and that is reachable by a person laying on the ground (e.g., if an officer is wounded and crawls back to the car). The panic button system 300 here comprises multiple buttons separated by a small distance to inhibit accidental activation while allowing single hand activation. A housing for the LPR system 90 could contain other items such as a video camera and/or a radar system (e.g., for detecting vehicular speed). The steering wheel assembly 16 could further include a removable memory for storing information, e.g., information conveyed to the dashboard 12 and/or input by a user of the dashboard 12 such as video, notes, times of calls or other events, etc. The memory could be removed, e.g., at the end of a police officer's shift, and docked in an appropriate receptacle for uploading the stored information for use in recording the events of the shift.

Further, while the description above refers to the invention, the description may include more than one invention.

What is claimed is:

1. For use with a vehicle including a body, wheels, a driver seat, and an engine, an instrument panel configured to be disposed at least partially in front of the seat and comprising:
    a steering wheel disposed in front of the seat;
    a display configured to provide information to a person seated in the seat; and
    a modular housing configured to hold the display and the steering wheel, the steering wheel being rotatably connected to the housing, the display connected to the housing, the housing extending substantially an entire width of a passenger area of the vehicle, the modular housing comprising a plurality of independent sections that can be removed and replaced independently of any other section of the housing, wherein the housing provides a keyboard receptacle and the instrument panel further comprises a keyboard assembly configured to be retracted within the keyboard receptacle and extended from the keyboard receptacle, the keyboard assembly including a support and a keyboard rotatably connected to the support.

2. The instrument panel of claim 1 wherein the instrument panel is configured to be disposed in a car containing the driver seat and a front passenger seat, the instrument panel being configured to be disposed in the car and separated from the driver seat and the passenger seat to provide a substantially open path between the driver seat and the passenger seat.

3. The instrument panel of claim 2 wherein the instrument panel is configured to be disposed in the car and separated from the driver seat and the passenger seat by a sufficient distance to allow a person to move the person's legs horizontally from in front of one of the seats to in front of the other seat.

4. The instrument panel of claim 1 wherein the housing is configured to provide a filing cabinet compartment.

5. The instrument panel of claim 4 wherein the housing is configured to provide the filing cabinet compartment sloping downward from front to back.

6. The instrument panel of claim 1 further comprising a plurality of radio channel selectors coupled to a two-way radio and configured to select corresponding channels of the radio, the channel selectors being configured and disposed to be actuated by a user wearing gloves while inhibiting multiple simultaneous actuation of the selectors by a single digit of the user.

7. The instrument panel of claim 1 further comprising a first display screen disposed within the housing and configured to be moved to face either the driver seat or a passenger seat of the vehicle.

8. The instrument panel of claim 7 further comprising:
    a second display screen; and
    a computer coupled to the first and second display screens and configured to receive a wireless communication from outside of the vehicle and to cause the first display screen to display detailed information of the wireless communication and to cause the second display screen to display summary information of the wireless communication;
    wherein the second display screen is disposed substantially in front of the driver seat.

9. The instrument panel of claim 1 further comprising a steering wheel assembly connected to the housing and comprising:
    a central unit including an interface panel disposed in front of the driver seat and configured to be physically accessed by a person in the driver seat; and
    a steering wheel rotatably connected to the central unit;
    wherein the central unit and steering wheel are configured such that interface panel will remain stationary relative to the housing while the steering wheel is rotated.

10. The instrument panel of claim 9 wherein the interface panel includes a plurality of actuators disposed within reach of a typical adult's thumbs when the adult's hands are grasping the steering wheel.

11. The instrument panel of claim 9 wherein the steering wheel is connected to the central unit by a connecting member and wherein the interface panel is disposed distally from the connecting member relative to the housing.

12. The instrument panel of claim 1 further comprising a plurality of actuator knobs configured to control operational status of corresponding features of the vehicle, the knobs being configured and spaced to facilitate actuation by a user wearing gloves and to inhibit accidental actuation of an adjacent one of the knobs.

13. The instrument panel of claim 12 wherein each of the knobs comprises a grooved collar rotatably connected to a fixed shaft.

14. For use with a police vehicle including a body, wheels, a driver seat, a passenger seat, and an engine, an instrument panel configured to be disposed in a passenger compartment of the vehicle and at least partially in front of the seat and comprising:
    a modular housing extending substantially an entire width of the passenger compartment, the modular housing comprising a plurality of independent sections that can be removed and replaced independently of any other section of the housing;
    a steering column connected to the housing and including a plurality of function selectors disposed on a terminal end of the steering column;
    a steering wheel rotatably connected to the steering column and connected to the housing to be disposed in front of the driver seat with the instrument panel disposed in the passenger compartment, the steering wheel being sized such that the plurality of function selectors are disposed centrally relative to a perimeter of the steering wheel with the function selectors remaining stationary relative to the housing while the steering wheel is rotated;
    a computer disposed within the housing and configured to receive wireless communications;
    a first display configured to provide information to a person seated in the seat, the first display being coupled to the computer and configured to display information wirelessly received by the computer, the first display being disposed relative to the housing to be directly in front the driver seat;

a second display integrated into one of the modular housing sections and configured to tilt horizontally and vertically to face either the driver seat or the passenger seat; and a keyboard retractably mounted to the dashboard to be received by the dashboard or extended from the dashboard and rotated when extended from the dashboard.

15. The instrument panel of claim 14 wherein at least one of the housing sections provides a shelving unit of slots extending downwardly away from a front of the housing section to receive and retain items placed in the shelving unit, and wherein at least one of the housing sections provides a substantially horizontal, substantially flat, supported surface configured to be extended from and retracted into the housing.

* * * * *